(12) United States Patent  
Gammel et al.

(10) Patent No.: US 9,195,857 B2
(45) Date of Patent: Nov. 24, 2015

(54) COMPUTATIONAL SYSTEM (71) Applicant: Infineon Technologies AG, Neubiberg (DE)

(72) Inventors: Berndt Gammel, Markt-Schwaben (DE); Tomaz Felicijan, Graz (AT); Stefan Mangard, Munich (DE)

(73) Assignee: Infineon Technologies AG, Neubiberg (DE)

( * ) Notice: Subject to any disclaimer, the term of this patent is extended or adjusted under 35 U.S.C. 154(b) by 80 days.

(21) Appl. No.: 14/040,840

(22) Filed: Sep. 30, 2013

(65) Prior Publication Data

US 2015/0095660 A1   Apr. 2, 2015

(51) Int. Cl.
*G06F 21/71* (2013.01)
*G06F 21/72* (2013.01)
*G06F 21/44* (2013.01)

(52) U.S. Cl.
CPC .............. *G06F 21/71* (2013.01); *G06F 21/445* (2013.01); *G06F 21/72* (2013.01); *G06F 2221/2103* (2013.01); *G06F 2221/2143* (2013.01)

(58) Field of Classification Search
CPC ....... G06F 21/71; G06F 21/72; G06F 21/445; G06F 2221/2103; G06F 2221/2143
See application file for complete search history.

(56) References Cited

U.S. PATENT DOCUMENTS

| 6,154,819 | A  | * | 11/2000 | Larsen et al. | 711/163 |
| 6,377,691 | B1 | * | 4/2002 | Swift et al. | 380/277 |
| 8,250,625 | B2 | * | 8/2012 | Risley | 726/1 |
| 2002/0046226 | A1 | * | 4/2002 | Nakabe et al. | 708/250 |
| 2003/0145216 | A1 | * | 7/2003 | Nakane et al. | 713/193 |
| 2003/0196111 | A1 | * | 10/2003 | Lampson et al. | 713/200 |
| 2005/0005093 | A1 | * | 1/2005 | Bartels et al. | 713/150 |
| 2005/0094661 | A1 | * | 5/2005 | Seligman et al. | 370/449 |
| 2005/0111420 | A1 | * | 5/2005 | Fujii | 370/338 |
| 2005/0188218 | A1 | * | 8/2005 | Walmsley et al. | 713/200 |
| 2008/0109889 | A1 | * | 5/2008 | Bartels | 726/7 |
| 2008/0127311 | A1 | * | 5/2008 | Yasaki et al. | 726/4 |
| 2010/0150347 | A1 | * | 6/2010 | Teruyama | 380/255 |
| 2012/0102334 | A1 | * | 4/2012 | O'Loughlin et al. | 713/189 |
| 2012/0309416 | A1 | * | 12/2012 | Whelan et al. | 455/456.1 |
| 2014/0108825 | A1 | * | 4/2014 | O'Loughlin et al. | 713/193 |

* cited by examiner

*Primary Examiner* — Taghi Arani
*Assistant Examiner* — Sharon Lynch
(74) *Attorney, Agent, or Firm* — Murphy, Bilak & Homiller, PLLC (57) ABSTRACT

A computational system is configured to protect against integrity violation. The computational system includes a processing unit and a critical resource, the critical resource being controllable by the processing unit so as to be locked or unlocked. The critical resource is configured to intermittently transmit a polling value to the processing unit, and the processing unit is configured to apply a transformation onto the polling value so as to obtain a response value and send the response value back to the critical resource. The critical resource is configured to check the response value on correctness so as to obtain a check result, and subject the controllability to a dependency on the check result.

17 Claims, 5 Drawing Sheets

COMPUTATIONAL SYSTEM

TECHNICAL FIELD

Embodiments of the invention refer to a computational system configured to protect against integrity violation, to a method for protecting a computational system against integrity violation, to a non-transitory computer-readable storage medium and to an integrated chip.

BACKGROUND

Protection against integrity violation is becoming more and more important. This also applies to security controllers, secure memories, radio frequency identification devices (RFID) as well as many other devices which require protection against integrity violation that is for example caused by physical attacks. In the following, the term "attack" means extracting a secret or manipulating data for the benefit of an attacker.

To this purpose, integrity violation comprises inducing faults during the execution of a program on the security controller, secure memory, RFID device, etc., or during operation of a finite state machine (FSM) on the respective device. Faults can be induced by several means, for example by voltage spikes, laser light, ionizing radiation, probe needles, etc. One of a variety of examples of inducing faults comprises disturbing an address pointer to an output buffer during an output operation in such a way that the address pointer points to the storage location of a secret key used to both encrypt and decrypt messages. Such an attack would result in the output routine sending the secret key out of the device instead of sending the contents of the output buffer as intended.

In a further example, integrity violation is initiated by manipulating a program counter in such a way that a programming routine for a non-volatile memory is called, instead of calling some other routine as intended. This example of integrity violation results to important data might be overwritten with values under the control of the respective attacker.

Protection mechanisms like access right flags in memory management units are used to protect against integrity violation. Protection levels (kernel, user, etc.) are known as well as data redundancy, redundant operations, etc. However, these protection mechanisms have been subjected to integrity violation, too.

SUMMARY

An embodiment of the invention provides a computational system configured to protect against integrity violation, the computational system comprising a processing unit and a critical resource, the critical resource being controllable by the processing unit so as to be locked or unlocked, wherein the critical resource is configured to intermittently transmit a polling value to the processing unit, the processing unit being configured to apply a transformation onto the polling value so as to obtain a response value and send the response value back to the critical resource, and the critical resource being configured to check the response value for correctness so as to obtain a check result, and subject the controllability of the critical resource by the processing unit to a dependency on the check result.

A further embodiment provides a method for protecting a computational system against integrity violation, the computational system comprising a processing unit and a critical resource, the critical resource being controllable by the processing unit so as to be locked or unlocked, wherein the method comprises: intermittently transmitting a polling value from the critical resource to the processing unit; applying a transformation onto the polling value so as to obtain a response value; sending the response value from the processing unit back to the critical resource; checking the response value for correctness so as to obtain a check result; and subjecting the controllability of the critical resource by the processing unit to a dependency on the check result.

A further embodiment provides a non-transitory computer-readable storage medium storing program instructions which when executed by a computational system protects the computational system against integrity violation, the computational system comprising a processing unit and a critical resource, the critical resource being controllable by the processing unit so as to be locked or unlocked, the program instructions comprising: first program code for causing the computational system to execute processing of intermittently transmitting a polling value from the critical resource to the processing unit; second program code for causing the computational system to execute processing of applying a transformation onto the polling value so as to obtain a response value; third program code for causing the computational system to execute processing of sending the response value from the processing unit back to the critical resource; forth program code for causing the computational system to execute processing of checking the response value for correctness so as to obtain a check result; and fifth program code for causing the computational system to execute processing of subjecting the controllability of the critical resource by the processing unit to a dependency on the check result.

A further embodiment provides an integrated chip comprising a central processing unit and a cryptographic peripheral, the cryptographic peripheral being controllable by the central processing unit so as to be locked or unlocked, wherein the cryptographic peripheral is configured to intermittently transmit a polling value to the central processing unit, the central processing unit being configured to apply a transformation onto the polling value so as to obtain a response value and send the response value back to the cryptographic peripheral, and the cryptographic peripheral being configured to check the response value for correctness so as to obtain a check result, and subject the controllability of the cryptographic peripheral by the central processing unit to a dependency on the check result, wherein the central processing unit is configured to control the cryptographic peripheral so as to be locked if the cryptographic peripheral is not required by a program executed on the central processing unit, and unlocked if the cryptographic peripheral is required by the program executed on the central processing unit.

Those skilled in the art will recognize additional features and advantages upon reading the following detailed description, and upon viewing the accompanying drawings.

BRIEF DESCRIPTION OF THE DRAWINGS

Embodiments of the present invention are described in the following with respect to the figures.

DETAILED DESCRIPTION

Different embodiments of the teachings disclosed herein will subsequently be discussed referring to FIG. 1 to FIG. 6. In the drawings, identical reference numerals are provided to objects having identical or similar functions so that objects referred to by identical reference numerals within the different embodiments are interchangeable and the description is mutually applicable.

Figure 1:
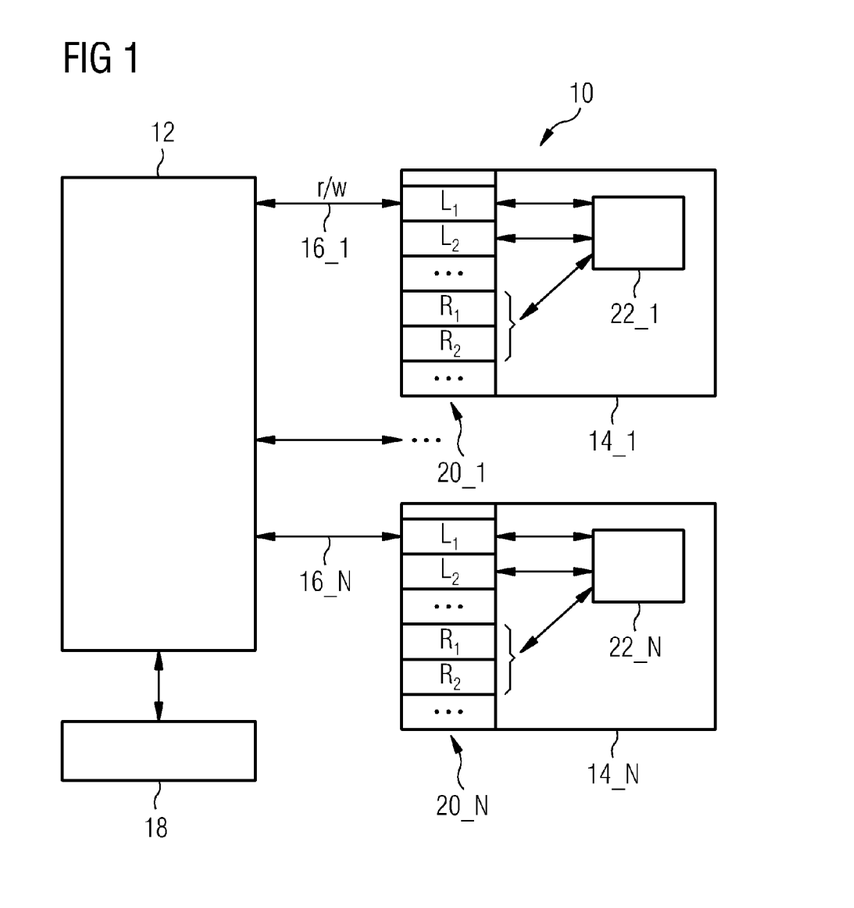
FIG. 1 shows a block diagram of a computational system.

FIG. 1 shows a schematic block diagram of a computational system 10 comprising a processing unit 12 interconnected to a plurality of critical resources 14_1 to 14_N. The critical resources 14_1 to 14_N are connected to the processing unit 12 by read/write lines 16_1 to 16_N, respectively, allowing communications in both directions. By way of example, the processing unit 12 is shown connected to a further resource 18, for example a non-cryptographic processor or USB peripheral device.

Protection against fault attacks, i.e. integrity violation, is achieved by disabling each of the critical resources 14_1 to 14_N which are not needed during an operation of the computational system 10. In particular, protection against integrity violation is achieved by disabling the access to a number of the plurality of the critical resources 14_1 to 14_N which are not needed during an operation of the computational system 10. As an example, in the course of an encryption process, respective ones of the plurality of critical resources 14_1 to 14_N such as a UART peripheral device, are set to be disabled while a secret key is transferred from a memory storing said secret key to an encryption device or routine so as to avoid unwanted leaking of keys outwardly. While not shown, both the memory and the encryption device are comprised in the computational system 10.

As mentioned above, the respective ones of the plurality of critical resources 14_1 to 14_N are disabled in the course of the encryption process. In other words, the processing unit 12 controls the respective ones of the plurality of critical resources 14_1 to 14_N so as to be locked in case of the critical resources being not required for an operation of the computational system 10, and to be unlocked in case of the critical resources being required for the operation of the computational system 10. As a precautionary measure only it is noted that intermediate states may be set as well: the restriction of any critical resources may be of gradual nature. For example, only a proper subset of the critical resource's functionalities are disabled, while others are left active. Thus, locking may merely lead to a disablement of a subpart of functionalities of the respective critical resource locked.

After termination of the encryption process, the secret key is cleared in the encryption device. Afterwards, the respective ones of the plurality of critical resources 14_1 to 14_N are enabled and the encryption result is output. In this way, the secret key cannot leak easily from the memory or encryption device to at least one of the plurality of critical resources 14_1 to 14_N, which leakage could be induced by integrity violation, for example.

The process of disabling and enabling respective ones of the plurality of critical resources 14_1 to 14_N, as mentioned above, can be executed for example by the peripherals directly or a central peripheral access unit (PAU), for example. For an attacker, one of a number of possibilities to elude the digital countermeasure used to protect against integrity violation, as mentioned above, is in enabling at least one of the plurality of critical resources 14_1 to 14_N by way of a simple attack. In other words, during the process of transferring the secret key from the memory to the encryption device, and during the encryption process itself, at least one of the plurality of critical resources 14_1 to 14_N can be forced by the attacker to be enabled by way of integrity violation. In doing so, the secret key can be spied out during transmission from the memory or encryption device to the at least one critical resource, which has been enabled by way of integrity violation.

A locking mechanism for critical resources is envisaged, which locking mechanism is able to inhibit, i.e. to prevent unprohibited enabling of the critical resource. To do so, locking and unlocking sequences are generated, which are used to lock and unlock the critical resource. In particular, the respective ones of the plurality of critical resources 14_1 to 14_N are controlled by the processing unit 12 so as to be locked or unlocked. Hence, unauthorized enabling of a respective critical resource is inhibited.

Referring back to FIG. 1, the critical resources 14_1 to 14_N comprise register stacks 20_1 to 20_N, respectively. Each of the register stacks 20_1 to 20_N comprise a plurality of registers. Further, the critical resources 14_1 to 14_N comprise finite state machines 22_1 to 22_N, respectively. Each of the registers of a respective one of the register stacks 20_1 to 20_N is connected to a respective one of the finite state machines 22_1 to 22_N.

To accomplish the locking mechanism mentioned above, at least one of the critical resources 14_1 to 14_N intermittently transmits a polling value to the processing unit 12 via a respective one of the read/write lines 16_1 to 16_N. This polling value is stored in advance in one of the registers of the respective critical resource. Note that this polling value can be hardware implemented, as well. In this option, provision of the registers can be omitted.

The processing unit 12 in turn applies a transformation onto the polling value received, so as to obtain a response value. Then, the processing unit 12 transmits the response value back to the respective critical resource via the respective read/write line. Further, the critical resource checks the response value for correctness such as to obtain a check result. Depending on the check result, the critical resource subjects the controllability.

In other words, the sequence mentioned above consists of a sequence of read and write operations to the registers of the stack of registers 20_1 to 20_N of the respective critical resource 14_1 to 14_N. During the read and write operations, specific values are transferred in either direction. The finite state machine 22_1 to 22_N, comprised in each critical resource 14_1 to 14_N, respectively, keeps track of the order of the operations and the transferred values and grants access only if the sequence and values are correct.

As an additional parameter of the sequence, information relating to a time base can be used. For example, a resource is unlocked, an operation is performed on the same, and then the resource is configured to lock again after this operation automatically. In this case, the unlocking would be performed merely for one operation, and the locking would be performed automatically after execution of the operation. The time base could, thus, grant the un-locked state merely for a preliminary time and indicate this preliminary nature of the unlocking, or even indicate the preliminary time measured, for example, in number of executions of the operation or time. Note that the critical resource initiates the transmission of the polling value to the respective critical resources 14_1 to 14_N upon receipt of a command from the processing unit 12 controlling the respective critical resource 14_1 to 14_N so as to unlock. Besides checking the response value on corrections so as to obtain a check result, as mentioned above, the critical resource subjects the controllability to a dependency on the check result based on the response value of a sequence of polling values. As an option, in case of the critical resource comprises the plurality of registers in the register stacks 20_1 to 20_N, the at least one critical resource 14_1 to 14_N reads the sequence of polling values from different ones of the plurality of registers.

Summarized, the computational system 10 is provided comprising the processing unit 12 which is configured to control the respective critical resource so as to be locked in case of the critical resource being not required for an operation of the computational system 10, and unlocked in case of the critical resource being required for the operation of the computational system 10.

The computational system 10 is further able to exchange sequences between the processing unit 12, for example a central processing unit, also referred to as a requester, and a plurality of critical resources 14_1 to 14_N, also referred to as cryptographic peripherals. In particular, the critical resources 14_1 to 14_N refer to modules which handle data which should be kept secret or must be integral.

This holds true for a memory area holding a secret key, for example in a random access memory (RAM) or a non-volatile memory (NVM). Further, the critical resources 14_1 to 14_N mentioned above are defined by a peripheral device operating with the secret, for example an encryption module. In another example, the critical resources 14_1 to 14_N can be exemplified by peripheral devices which are able to reveal this secret, but usually not intended to do so, for example an output device like a universal asynchronous receiver transmitter (UART) or a universal serial bus (USB) peripheral device.

Figure 2:
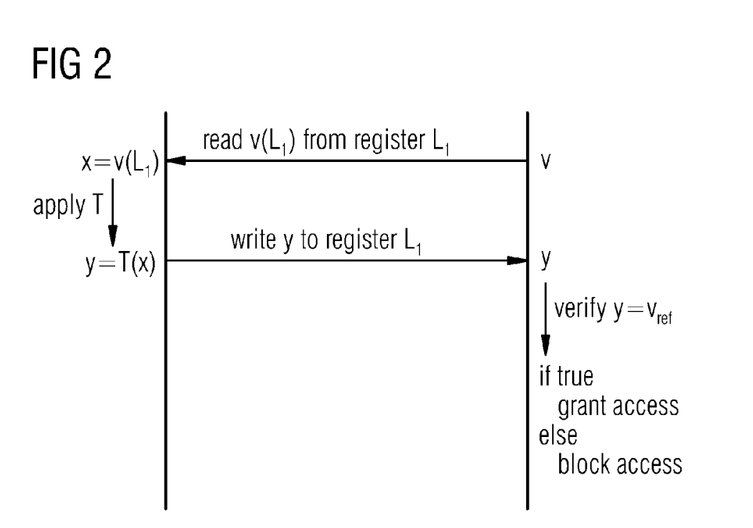
FIG. 2 shows a schematic sequence diagram to exemplify a method for protecting a computational system according to an embodiment of the invention.

FIG. 2 shows a sequence diagram, indicating an example of a locking sequence comprising read and write operations between a critical resource (contemplated on the right side of the figure) and a processing unit (contemplated on the left side of the figure). The locking sequence shown in this diagram comprises transmitting a polling value $x=v(L_1)$ read from a register $L_1$ of the critical resource to the processing unit (refer to FIG. 1). The processing unit in turn applies a transformation T onto the polling value $x=v(L_1)$ to arrive to the result of the formula $y=T(x)$, wherein the result y is defined as response value.

Following this transformation, the processing unit transmits the response value y back to the critical resource. In particular, the response value y is written to register $L_1$ of the critical resource. After writing y to register $L_1$, the critical resource checks this response value y for correctness so as to obtain a check result, and subjects the controllability to a dependency on the check result. Additionally or as an option, the critical resource checks the sequence of the read and write operations for correctness so as to obtain a check result, and subjects the controllability to a dependency on the check result. In particular, the finite state machine (refer to FIG. 1) of the critical resource checks that the read operation from the register $L_1$ is followed by the write operation to the register $L_1$ using the correct value $v_{ref}=T(v)$.

Note that the critical resource is configured to subject the controllability to a dependency on the check result of the response value of a sequence of polling values. The critical resource is configured to, in subjecting the controllability to a dependency on the check result, count a number of accesses of the processing unit to the critical resource during the critical resource being unlocked, so as to automatically lock upon the number of accesses exceeding a predetermined value.

Figure 3:
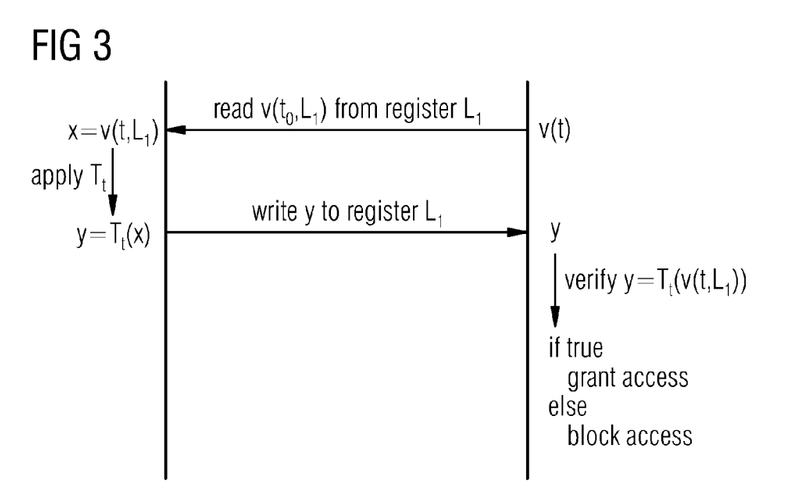
FIG. 3 shows a schematic sequence diagram to exemplify a method for protecting a computational system according to a further embodiment of the invention.

FIG. 3 shows a sequence diagram, showing an example of a locking sequence comprising read and write operations between a critical resource and a processing unit (refer to FIG. 1). The locking sequence shown in this diagram comprises transmitting a polling value $x=v(t_0,L_1)$ read from register $L_1$ of the critical resource to the processing unit (refer to FIG. 1). In contrast to the sequence shown in FIG. 2, the value v read from the register $L_1$ is now a sequence value or random value $v(t_0,L_1)$ on a time base. The processing unit in turn applies a transformation T onto the polling value $x=v(t,L_1)$ to arrive to the result of the formula $y=T_t(x)$, wherein the result y is defined as response value. After this transformation is executed, the processing unit transmits the response value y back to the critical resource. In particular, the response value y is written to register $L_1$. After writing y to register $L_1$, the critical resource checks this response value y for correctness so as to obtain a check result, and subjects the controllability to a dependency on the check result. In other words, the transformation T has to calculate and write back $T_t(v(t,L_1))$.

In doing so, assuming integrity violation, this violation cannot force the value T to some constant ($v_{ref}$), which constant might been spied out before. This renders integrity violation once more difficult. Further, in the example shown in FIG. 3, this transformation also depends on the time index t, i.e. $T=T_t$. Hence, the transformation is different in each point of time.

Additionally or as an option, the critical resource checks the sequence of the read and write operations for correctness so as to obtain a check result, and subjects the controllability to a dependency on the check result. The critical resource is configured to, in subjecting the controllability to a dependency on the check result, count a number of accesses of the processing unit to the critical resource during the critical resource being unlocked, so as to automatically lock upon the number of accesses exceeding a predetermined value.

In particular, the finite state machine (each to FIG. 1) of the critical resource checks that the read operation from the register $L_1$ is followed by the write operation to the register $L_1$ using the correct value $v_{ref}=T_t(v(t,L_1))$.

Figure 4:
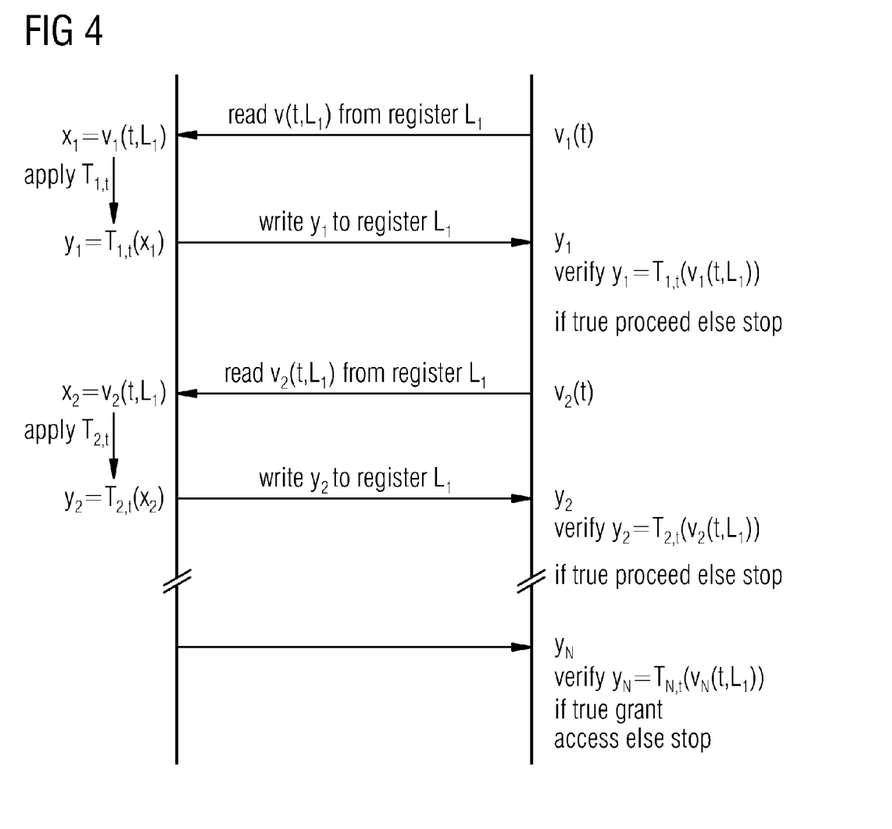
FIG. 4 shows a schematic sequence diagram to exemplify a method for protecting a computational system requiring more than two steps, according to a further embodiment of the invention.

FIG. 4 shows a further exemplary sequence diagram showing locking or unlocking sequences requiring more than two steps. In particular, FIG. 4 shows a sequence diagram, showing an example of a plurality of locking sequences comprising read and write operations between a critical resource and a processing unit.

The locking sequence shown in this diagram comprises transmitting a polling value $x=v_1(t,L_1)$ read from register $L_1$ of the critical resource to the processing unit (refer to FIG. 1). In contrast to the sequence shown in FIG. 2, the value v read from the register $L_1$ is now a sequence value or random value $v_1(t,L_1)$. The processing unit in turn applies a transformation $T_{1,t}$ onto the polling value $x=v_1(t,L_1)$ to arrive to the result of the formula $y_1=T_{1,t}(x_1)$, wherein the result $y_1$ is defined as response value. After this transformation, the processing unit transmits the response value $y_1$ back to the critical resource. In particular, the response value $y_1$ is written to register $L_1$ to serve as polling value for a next transmission to the processing unit. After writing $y_1$ to register $L_1$, the critical resource checks this response value $y_1$ for correctness so as to obtain a check result, and subjects the controllability to a dependency on the check result. In other words, the transformation T has to calculate and write back $T_{1,t}(v_1(t,L_1))$.

If $y_1=T_{1,t}(v_1(t,L_1))$ is not true, the sequence is stopped and an integrity violation alarm is output. However, if $y_1=T_{1,t}(v_1(t,L_1))$ is true, the sequence proceeds to a sequence of transmitting the polling value $x=v_2(t,L_1)$ read from register $L_1$ of the critical resource to the processing unit. Note, that this polling value has been written back into register $L_1$ in the sequence before. The processing unit in turn applies a transformation $T_{2,t}$ onto the polling value $x_2=v_2(t,L_1)$ to arrive to the result of the formula $y_2=T_{2,t}(x_2)$, wherein the result $y_2$ is defined as response value. After this transformation, the processing unit transmits the response value $y_2$ back to the critical resource. In particular, the response value $y_2$ is written to register $L_1$. After writing $y_2$ to register $L_1$, the critical resource checks this response value $y_2$ for correctness so as to obtain a check result, and subjects the controllability to a dependency on the check result. In other words, the transformation T has to calculate and write back $T_{2,t}(v_2(t,L_1))$.

If $y_1=T_{1,t}(v_1(t,L_1))$ is not true, the sequence is stopped and an integrity violation alarm is output. However, if $y_1=T_{1,t}(v_1(t,L_1))$ is true, the sequence proceeds to a sequence of transmitting the polling value $x=v_2(t,L_1)$ read from register $L_1$ of the critical resource to the processing unit. Note, that this polling value has been written back into register $L_1$ in the sequence before. The processing unit in turn applies a transformation $T_{2,t}$ onto the polling value $x_2=v_2(t,L_1)$ to arrive to the result of the formula $y_2=T_{2,t}(x_2)$, wherein the result $y_2$ is defined as response value. After this transformation, the processing unit transmits the response value $y_2$ back to the critical resource. In particular, the response value $y_2$ is written to register $L_1$. After writing $y_2$ to register $L_1$, the critical resource checks this response value $y_2$ on correctness so as to obtain a check result, and subjects the controllability to a dependency on the check result. In other words, the transformation T has to calculate and write back $T_{2,t}(v_2(t,L_1))$.

If $y_2=T_{2,t}(v_2(t,L_1))$ is not true, the sequence is stopped and an integrity violation alarm is output. However, if $y_2=T_{2,t}(v_2(t,L_1))$ is true, the sequences above are repeated N-times, wherein N is an integer predetermined or set by an operator.

Additionally or as an option, the critical resource checks the sequence of the read and write operations for correctness so as to obtain a check result, and subjects the controllability to a dependency on the check result. The critical resource is configured to, in subjecting the controllability to a dependency on the check result, count a number of accesses of the processing unit to the critical resource during the critical resource being unlocked, so as to automatically lock upon the number of accesses exceeding a predetermined value.

In particular, the finite state machine of the critical resource checks N-times that the read operation from the register $L_1$ is followed by the write operation to the register $L_1$ using the correct value $v_{ref}=T_{N,t}(v_N(t,L_1))$.

Compared to the sequences indicated in FIGS. 2 and 3, higher reliability in detecting integrity violation is provided. Note that this reliability increases the higher the number of N is.

Figure 5:
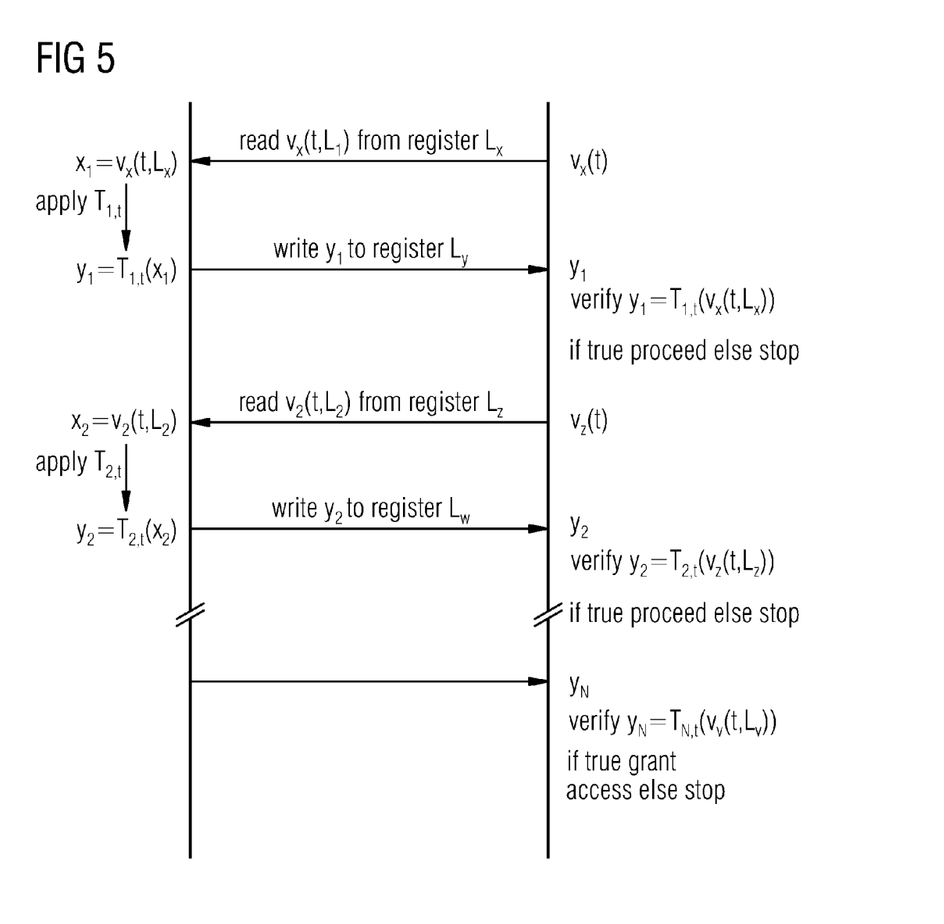
FIG. 5 shows a schematic sequence diagram to exemplify a method for protecting a computational system requiring access to more than one lock register, according to a further embodiment of the invention.

FIG. 5 shows another exemplary sequence diagram showing locking or unlocking sequences requiring access to more than one register. In this example, the critical resource is configured to subject the controllability to a dependency on the check result of the response value of a sequence of polling values, wherein the critical resource comprises the plurality of registers and is configured to read the sequence of polling values from different ones of the plurality of registers.

The sequences shown in FIG. 5 comprise transmitting a polling value $x=v_x(t,L_1)$ read from register $L_x$ of a plurality of registers of the critical resource to the processing unit (refer to FIG. 1). The value read from the register $L_x$ is now a sequence value or random value $v_x(t,L_1)$. The processing unit in turn applies a transformation $T_{1,t}$ onto the polling value $x_1=v_x(t,L_x)$ to arrive to the result of the formula $y_1=T_{1,t}(x_1)$, wherein the result $y_1$ is defined as response value. After this transformation is executed, the processing unit transmits the response value $y_1$ back to the critical resource. In particular, the response value $y_1$ is written back to register $L_y$, different from register $L_x$ to serve as polling value for a next transmission to the processing unit. After writing $y_1$ to register $L_y$, the critical resource checks this response value $y_1$ for correctness so as to obtain a check result, and subjects the controllability to a dependency on the check result. In other words, the transformation T has to calculate and write back $T_{1,t}(v_x(t,L_x))$.

If $y_1=T_{1,t}(v_x(t,L_x))$ is not true, the sequence is stopped and an integrity violation alarm is output. However, if $y_1=T_{1,t}(v_x(t,L_x))$ is true, the sequence proceeds to a sequence of transmitting a polling value $x=v_z(t,L_z)$ read from register $L_z$ (which differs from registers $L_x$ and $L_y$) of the critical resource to the processing unit. The processing unit in turn applies a transformation $T_{2,t}$ onto the polling value $x_2=v_z(t,L_z)$ to arrive to the result of the formula $y_2=T_{2,t}(x_2)$, wherein the result $y_2$ is defined as response value. After this transformation is executed, the processing unit transmits the response value $y_2$ back to the critical resource. In particular, the response value $y_2$ is written to a next register $L_w$, (which differs from registers $L_x$, $L_y$, and $L_z$). After writing $y_2$ to register $L_w$, the critical resource checks this response value $y_2$ for correctness so as to obtain a check result, and subjects the controllability to a dependency on the check result. In other words, the transformation T has to calculate and write back $T_{2,t}(v_z(t,L_z))$.

If $y_2=T_{2,t}(v_z(t,L_z))$ is not true, the sequence is stopped and an integrity violation alarm is output. However, if $y_2=T_{2,t}(v_z(t,L_z))$ is true, the sequences above are repeated N-times, wherein N is an integer predetermined or set by an operator.

Additionally or as an option, the critical resource checks the sequence of the read and write operations on correctness so as to obtain a check result, and subjects the controllability to a dependency on the check result. The critical resource is configured to, in subjecting the controllability to a dependency on the check result, count a number of accesses of the processing unit to the critical resource during the critical resource being unlocked, so as to automatically lock upon the number of accesses exceeding a predetermined value. Further, the critical resource is configured to, in subjecting the controllability to a dependency on the check result, measure a time duration of the critical resource being unlocked, so as to automatically lock upon the time duration exceeds a predetermined value.

In particular, the finite state machine of the critical resource checks N-times that the read operation from the register $L_N$ is followed by the write operation to the register $L_N$ using the correct value $v=T_{N,t}(v_v(t,L_v))$.

Summarized, the critical resource is configured to subject the controllability to a dependency on the check result of the response value of a sequence of polling values, wherein the critical resource comprises a plurality of registers and is configured to read the sequence of polling values from different ones of the plurality of registers.

Compared to the sequences indicated in FIGS. 2 to 4, higher reliability in detecting integrity violation is provided due to the plurality of accesses to more than one register. Note that this reliability is increased by raising the number of N.

Further, the critical resource intermittently changes storage content of the register. As an option, this can be done using a random or pseudorandom sequence of values. As a further option, the processing unit sequentially changes the transformation in a deterministic manner. In particular, a feedback shift register may be used to perform the task of register value change.

In other words, the critical resource, while subjecting the controllability to a dependency on the check result, counts a number of accesses of the processing unit to the critical resource during the critical resource being unlocked, so as to automatically lock upon the number of accesses exceeding a predetermined value.

The critical resource, while subjecting the controllability to a dependency on the check result, measures a time duration of the critical resource being unlocked, so as to automatically lock upon the time duration exceeding a predetermined value. Note that the processing unit controls the critical resource so as to be locked in case of the critical resource being not required for an operation of the computational system, and to be unlocked in case of the critical resource being required for the operation computational system.

As described above, locking according to the sequence diagrams shown in FIGS. 2 to 4 may be valid only for one operation or a fixed number of operations. The critical resource automatically returns to the locked or unlocked state. However, for the next operation the resource must be unlocked again. If more than one access is allowed, the critical resource may count, for example, the number of accesses and check whether the allowed number is been reached or exceeded. IN the latter case, the access is denied.

However, unlocking or locking may also be endowed with a time dimension, i.e. a duration (d). As an example, the critical resource may measure the elapsed time between access operations based on a specific time base, for example, clock ticks, and/or from unlocking on, and if the measured time exceeds the limit, then the critical resource locks again.

Figure 6:
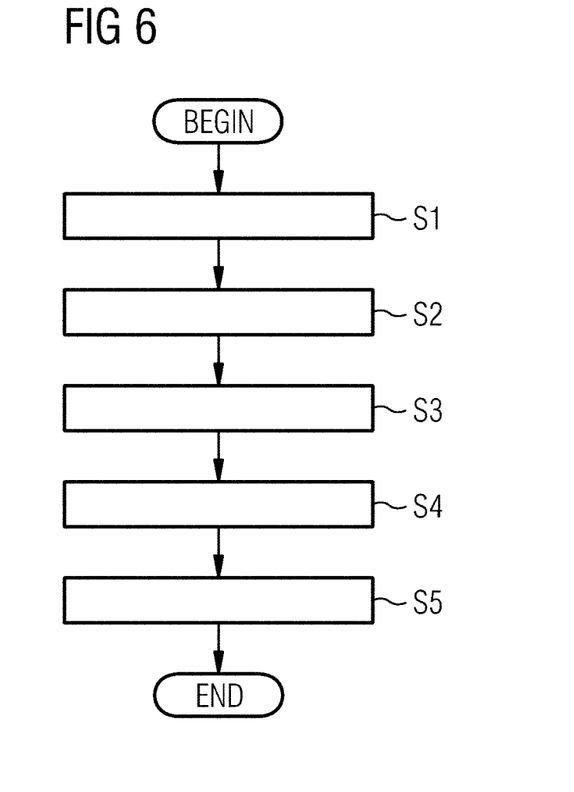
FIG. 6 shows a flow chart comprising steps performed by a method for protecting a computational system against integrity violation.

FIG. 6 shows a method for protecting a computational system against integrity violation. The computational system comprises a processing unit and a critical resource, wherein the critical resource is controllable by the processing unit so as to be locked or unlocked.

The method comprises a step S1 of intermittently transmitting a polling value from the critical resource to the processing unit. This step can include initiating the transmission of the polling value to the critical resource upon receipt of a comment from the processing unit controlling the critical resource so as to unlock.

The method further comprises a step S2 of applying a transformation onto the polling value so as to obtain a response value. Further comprised is a step S3 of sending the response value from the processing unit back to the critical resource. The method comprises the subsequent step S4 of checking the response value on correctness so as to obtain a check result. As an option, reading the polling value from the register and writing back the response value to the register are performed so as to serve as a polling value for a next transmission to the processing unit. The method further comprises the step S5 of subjecting the controllability of the critical resource to a dependency on the check result.

Additionally, the method can comprise a step of subjecting the controllability to a dependency on the check result of the response value of a sequence of polling values; and reading the sequence of polling values from different ones of the plurality of registers.

An exemplary sequence is a data stream or a sequence of signals representing a computer program for performing the method described herein. The data stream or the sequence of signals may for example be configured to be transferred via a data communication connection.

Generally, embodiments of the present invention can be implemented as a computer program product with a program code, the program code being operative for performing the method when the computer program product runs on a processing unit. The program code may for example be stored on a non-transitory computer-readable storage medium.

In particular, the method described herein can be executed by a computational system comprising a non-transitory computer-readable storage medium storing program instructions which when executed by the computational system protects the computational system against integrity violation. The computational system comprises a processing unit and a critical resource, the critical resource being controllable by the processing unit so as to be locked or unlocked.

The program instructions comprise a first program code for causing the computational system to execute processing of intermittently transmitting a polling value from the critical resource to the processing unit. Further comprised is a second program code for causing the computational system to execute processing of applying a transformation onto the polling value so as to obtain a response value. Further comprised is a third program code for causing the computational system to execute processing of sending the response value from the processing unit back to the critical resource.

Further comprised is a forth program code for causing the computational system to execute processing of checking the response value on correctness so as to obtain a check result. Further comprised is a fifth program code for causing the computational system to execute processing of subjecting the controllability of the critical resource to a dependency on the check result.

Further embodiments comprise an integrated chip comprising a central processing unit and a cryptographic peripheral, wherein the cryptographic peripheral is controllable by the central processing unit so as to be locked or unlocked. The cryptographic peripheral is configured to intermittently transmit a polling value to the central processing unit, the central processing unit is configured to apply a transformation onto the polling value so as to obtain a response value and send the response value back to the cryptographic peripheral.

Further, the cryptographic peripheral is configured to check the response value on correctness so as to obtain a check result, and subject the controllability to a dependency on the check result. The central processing unit is configured to control the cryptographic peripheral so as to be locked if the cryptographic peripheral is not required by a program executed on the central processing unit, and unlocked if the cryptographic peripheral is required by the program executed on the central processing unit.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus.

The above described embodiments are merely illustrative for the principles of the present invention. It is understood that modifications and variations of the arrangements and the details described herein will be apparent to others skilled in the art. It is the intent, therefore, to be limited only by the scope of the impending patent claims and not by the specific details presented by way of description and explanation of the embodiments herein.

What is claimed is:

1. A computational system configured to protect against integrity violation, the computational system comprising a processing unit and a critical resource, the critical resource being controllable by the processing unit so as to be locked or unlocked, wherein the critical resource is configured to intermittently transmit a polling value to the processing unit, the processing unit being configured to apply a transformation onto the polling value so as to obtain a response value and send the response value back to the critical resource, and the critical resource being configured to check the response value for correctness so as to obtain a check result, and subject controllability of the critical resource by the processing unit to a dependency on the check result, and wherein the critical resource comprises a register, the critical resource being configured to read the polling value for a first polling value for a first transmission to the processing unit from the register and to write back to the register the response value sent to the critical resource in response to the polling value for the first polling value, wherein the response value received in response to the polling value for the first polling value serves as a next polling value for a next transmission to the processing unit, wherein the processing unit is configured to control the critical resource so as to be locked when the critical resource is not required for an operation of the computational system, and unlocked when the critical resource is required for the operation of the computational system.

2. The computational system according to claim 1, wherein the critical resource is configured to initiate the transmission of the polling value to the processing unit upon receipt of a command from the processing unit controlling the critical resource so as to unlock.

3. The computational system according to claim 1, wherein the controllability of the critical resource by the processing unit is subject to a dependency on the check result of the response value of a sequence of polling values.

4. The computational system according to claim 1, wherein the controllability of the critical resource by the processing unit is subject to a dependency on the check result of the response value of a sequence of polling values, wherein the critical resource comprises a plurality of registers and is configured to read different polling values of the sequence of polling values from different registers.

5. The computational system according to claim 1, wherein the critical resource is configured to intermittently change a storage content of the register.

6. The computational system according to claim 1, wherein the critical resource is configured to intermittently change a storage content of the register using a random or pseudo-random sequence of values.

7. The computational system according to claim 1, wherein the processing unit is configured to sequentially change the transformation in a deterministic manner.

8. The computational system according to claim 1, wherein the critical resource is configured to count a number of accesses of the processing unit to the critical resource during the critical resource being unlocked, so as to automatically lock upon the number of accesses exceeding a predetermined value.

9. The computational system according to claim 1, wherein the critical resource is configured to measure a time duration of the critical resource being unlocked, so as to automatically lock upon the time duration exceeding a predetermined value.

10. A method for protecting a computational system against integrity violation, the computational system comprising a processing unit and a critical resource, the critical resource being controllable by the processing unit so as to be locked or unlocked, wherein the method comprises:

intermittently transmitting a polling value from the critical resource to the processing unit;

applying a transformation onto the polling value so as to obtain a response value;

sending the response value from the processing unit back to the critical resource;

checking the response value for correctness so as to obtain a check result;

subjecting controllability of the critical resource by the processing unit to a dependency on the check result;

reading the polling value of a first polling value for a first transmission to the processing unit from a register and writing back to the register the response value sent to the critical resource in response to the polling value for the first polling value, wherein the response value received in response to the polling value for the first polling value serves as a next polling value for a next transmission to the processing unit; and wherein the processing unit is configured to control the critical resource so as to be locked when the critical resource is not required for an operation of the computational system, and unlocked when the critical resource is required for the operation of the computational system.

11. The method according to claim 10, comprising:

initiating the transmission of the polling value to the processing unit upon receipt of a command from the processing unit controlling the critical resource so as to unlock.

12. The method according to claim 10, comprising:

subjecting the controllability of the critical resource by the processing unit to a dependency on the check result of the response value of a sequence of polling values.

13. The method according to claim 10, wherein the critical resource comprises a plurality of registers, wherein the method comprises:

subjecting the controllability of the critical resource by the processing unit to a dependency on the check result of the response value of a sequence of polling values; and reading different polling values of the sequence of polling values from different registers.

14. The method according to claim 10, wherein subjecting the controllability of the critical resource by the processing unit to a dependency on the check result comprises counting a number of accesses of the processing unit to the critical resource during the critical resource being unlocked, so as to automatically lock upon the number of accesses exceeding a predetermined value.

15. The method according to claim 10, wherein subjecting the controllability of the critical resource by the processing unit to a dependency on the check result comprises measuring a time duration of the critical resource being unlocked, so as to automatically lock upon the time duration exceeding a predetermined value.

16. A non-transitory computer-readable storage medium storing program instructions which when executed by a computational system protects the computational system against integrity violation, the computational system comprising a processing unit and a critical resource, the critical resource being controllable by the processing unit so as to be locked or unlocked, the program instructions comprising:

first program code for causing the computational system to execute processing of intermittently transmitting a polling value from the critical resource to the processing unit;

second program code for causing the computational system to execute processing of applying a transformation onto the polling value so as to obtain a response value;

third program code for causing the computational system to execute processing of sending the response value from the processing unit back to the critical resource;

forth fourth program code for causing the computational system to execute processing of checking the response value for correctness so as to obtain a check result; and fifth program code for causing the computational system to execute processing of subjecting controllability of the critical resource by the processing unit to a dependency on the check result;

sixth program code for reading the polling value of a first polling value for a first transmission to the processing unit from a register and for writing back to the register the response value sent to the critical resource in response to the polling value for the first polling value, wherein the response value received in response to the polling value for the first polling value serves as a next polling value for a next transmission to the processing unit; and wherein the processing unit is configured to control the critical resource so as to be locked when the critical resource is not required for an operation of the computational system, and unlocked when the critical resource is required for the operation of the computational system.

17. An integrated chip comprising a central processing unit and a cryptographic peripheral, the cryptographic peripheral being controllable by the central processing unit so as to be locked or unlocked, wherein the cryptographic peripheral is configured to intermittently transmit a polling value to the central processing unit, the central processing unit being configured to apply a transformation onto the polling value so as to obtain a response value and send the response value back to the cryptographic peripheral, and the cryptographic peripheral being configured to check the response value for correctness so as to obtain a check result, and subject controllability of the cryptographic peripheral by the central processing unit to a dependency on the check result, wherein the central processing unit is configured to control the cryptographic peripheral so that the cryptographic peripheral is locked when the cryptographic peripheral is not required by a program executed on the central processing unit, and unlocked when the cryptographic peripheral is required by the program executed on the central processing unit, and wherein the cryptographic peripheral comprises a register, the cryptographic peripheral being configured to read the polling value of a first polling value for a first transmission to the processing unit from the register and to write back to the register the response value sent to the cryptographic peripheral in response to the polling value for the first polling value, wherein the response value received in response to the polling value for the first polling value serves as a next polling value for a next transmission to the processing unit.

* * * * *